(12) United States Patent
Chen et al.

(10) Patent No.: US 12,305,848 B1
(45) Date of Patent: May 20, 2025

(54) MICROPHONE HAVING LIGHT-EMITTING STRUCTURE

(71) Applicant: Merry Electronics(Shenzhen) Co., Ltd., ShenZhen (CN)

(72) Inventors: Chun-Han Chen, Taichung (TW); Yu Cheng Tu, Taichung (TW); Po Yuan Tsai, Taichung (TW); Hung-Wen Tsao, Taichung (TW)

(73) Assignee: Merry Electronics (Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 18/893,833

(22) Filed: Sep. 23, 2024

(30) Foreign Application Priority Data

Sep. 4, 2024 (TW) ................. 113133477

(51) Int. Cl.
| | |
|---|---|
| *F21V 33/00* | (2006.01) |
| *F21V 8/00* | (2006.01) |
| *F21Y 103/10* | (2016.01) |
| *F21Y 115/10* | (2016.01) |
| *H04R 1/02* | (2006.01) |
| *H04R 1/08* | (2006.01) |

(52) U.S. Cl.
CPC ........ *F21V 33/0056* (2013.01); *G02B 6/0046* (2013.01); *H04R 1/028* (2013.01); *H04R 1/086* (2013.01); *F21Y 2103/10* (2016.08); *F21Y 2115/10* (2016.08)

(58) Field of Classification Search
CPC .................... F21V 33/0056; G02B 6/0046
See application file for complete search history.

(56) References Cited

U.S. PATENT DOCUMENTS

| | | | |
|---|---|---|---|
| 11,947,155 B1* | 4/2024 | Chen .................. | F21V 33/0056 |
| D1,032,560 S * | 6/2024 | Paterson ..................... | D14/496 |
| 2008/0219001 A1* | 9/2008 | Russell ................. | F21V 29/763 |
| | | | 362/246 |
| 2009/0136076 A1* | 5/2009 | Chi ........................ | H04R 1/026 |
| | | | 381/387 |
| 2017/0211750 A1* | 7/2017 | Yotsumoto .......... | F21V 33/0056 |
| 2019/0041050 A1* | 2/2019 | Cairns .................. | G02B 6/0085 |
| 2019/0394547 A1* | 12/2019 | Lemons ................ | H04R 1/028 |
| 2020/0124272 A1* | 4/2020 | Spencer ................ | H04R 1/025 |
| 2023/0105804 A1* | 4/2023 | Mao ....................... | H04R 1/023 |
| | | | 381/332 |

* cited by examiner

*Primary Examiner* — Keith G. Delahoussaye
(74) *Attorney, Agent, or Firm* — JCIPRNET

(57) ABSTRACT

A microphone having a light-emitting structure includes a housing, a main body, and multiple light-emitting structures. The main body is disposed in the housing. The light-emitting structures are disposed between the housing and the main body and fixed on the main body. Each of the light-emitting structures includes a light-emitting module and a light guide structure. The light-emitting module includes a circuit board and multiple light-emitting elements, and the light-emitting elements are disposed on the circuit board. The light guide structure includes a groove and a light guide part. The groove covers the light-emitting module. The light guide part is mountain-shaped and extends from the groove toward the housing.

11 Claims, 6 Drawing Sheets

MICROPHONE HAVING LIGHT-EMITTING STRUCTURE

CROSS-REFERENCE TO RELATED APPLICATION

This application claims the priority benefit of Taiwan application serial no. 113133477, filed on Sep. 4, 2024. The entirety of the above-mentioned patent application is hereby incorporated by reference herein and made a part of this specification.

BACKGROUND

Technical Field

This disclosure relates to a microphone, and in particular to a microphone having a light-emitting structure.

Description of Related Art

Currently, in order to enhance the visual experience of the appearance of the handheld microphone, light-emitting structures are added to the microphone to create a light-emitting effect when it is used. In addition, a light guide structure is added to the outside of the light-emitting element so that light can be transmitted evenly out of the microphone. However, the current design of the light guide structure tends to create obvious dark and bright areas when light is transmitted through the microphone, which results in poor luminescence and reduces the visual effect produced.

SUMMARY

The disclosure provides a microphone having a light-emitting structure with a good light-emitting effect.

The microphone having the light-emitting structure of the disclosure includes a housing, a main body, and multiple light-emitting structures. The main body is disposed in the housing. The light-emitting structures are disposed between the housing and the main body and are fixed to the main body. Each of the light-emitting structures also includes a light-emitting module and a light guide structure. The light-emitting module has a circuit board and multiple light-emitting elements, and the light-emitting elements are disposed on the circuit board. The light guide structure has a groove and a light guide part. The groove covers the light-emitting module. The light guide part is mountain-shaped and extends from the groove to the housing.

In an embodiment of the disclosure, the light guide part has a first inclined surface and a second inclined surface. The first inclined surface and the second inclined surface extend from the groove toward the housing and are connected to each other.

In an embodiment of the disclosure, the housing has a mesh structure.

In an embodiment of the disclosure, the mesh structure has multiple holes, and the holes are circular.

In an embodiment of the disclosure, the microphone having the light-emitting structure further includes a foam structure disposed between the housing and the light-emitting structures.

In an embodiment of the disclosure, the foam structure is translucent.

In an embodiment of the disclosure, a material of the light guide structure includes polycarbonate, light diffusing agent, and titanium dioxide.

In an embodiment of the disclosure, in the light guide structure, 1150 to 1350 grams of the light diffusing agent and 200 to 300 grams of the titanium dioxide are added for every 25 kilograms of the polycarbonate.

In an embodiment of the disclosure, the light guide structure is translucent.

In an embodiment of the disclosure, one of the light-emitting structures overlaps light emitted by the adjacent light-emitting structures.

In an embodiment of the disclosure, the light guide structure is integrally formed.

Based on the above, in the disclosure, the light guide part has a mountain-shaped structure, which can more effectively emit the light emitted by the light-emitting module out of the light-emitting structure and reduce the differences between bright areas and dark areas of the adjacent light-emitting structures. In addition, adding diffusing agent and titanium dioxide to the light guide structure can effectively diffuse light, making the light emitted by the light guide structure more uniform and improving the visual experience of the user.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1A:
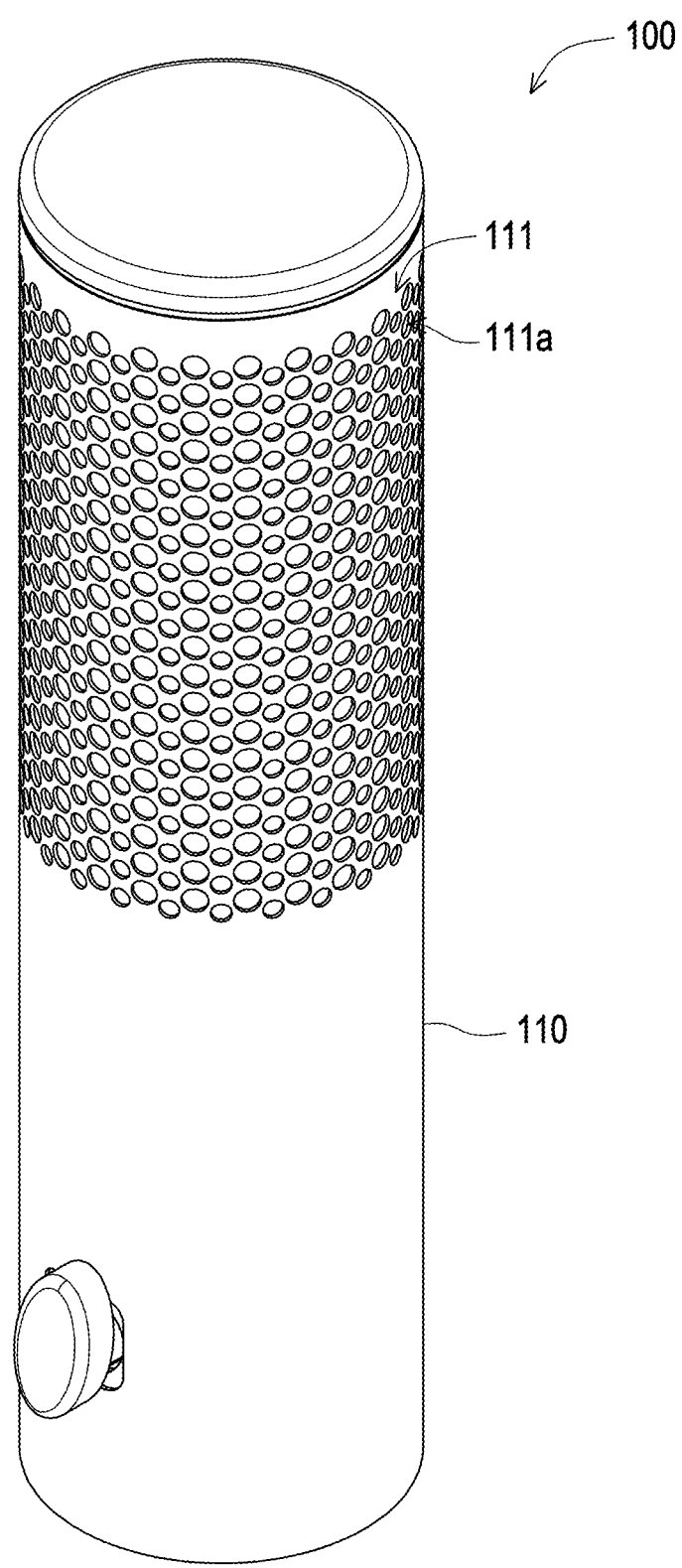
FIG. 1A is a schematic view of a microphone having a light-emitting structure in accordance with the disclosure.
Figure 1B:
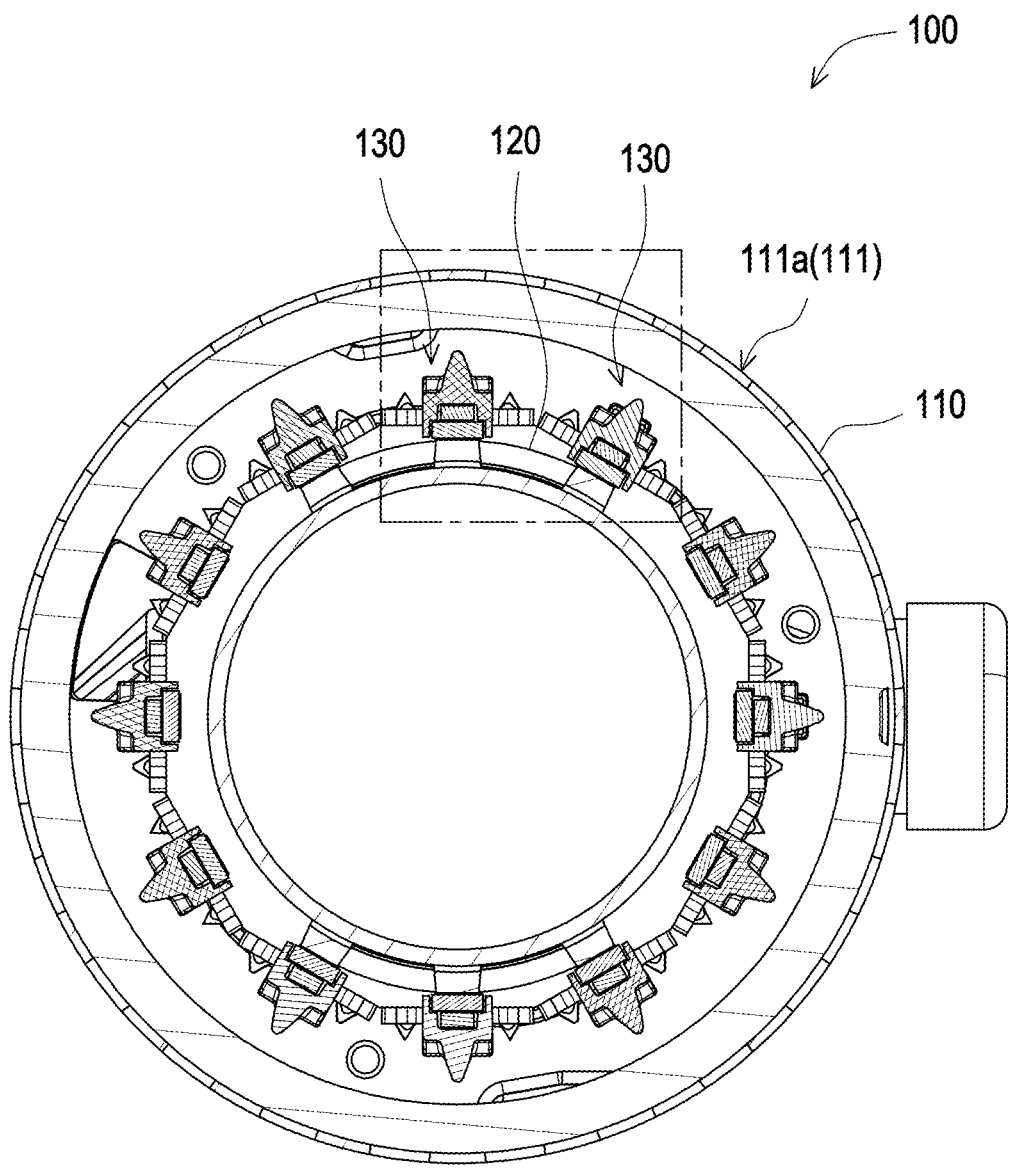
FIG. 1B is a cross-sectional view of FIG. 1A.
Figure 1C:
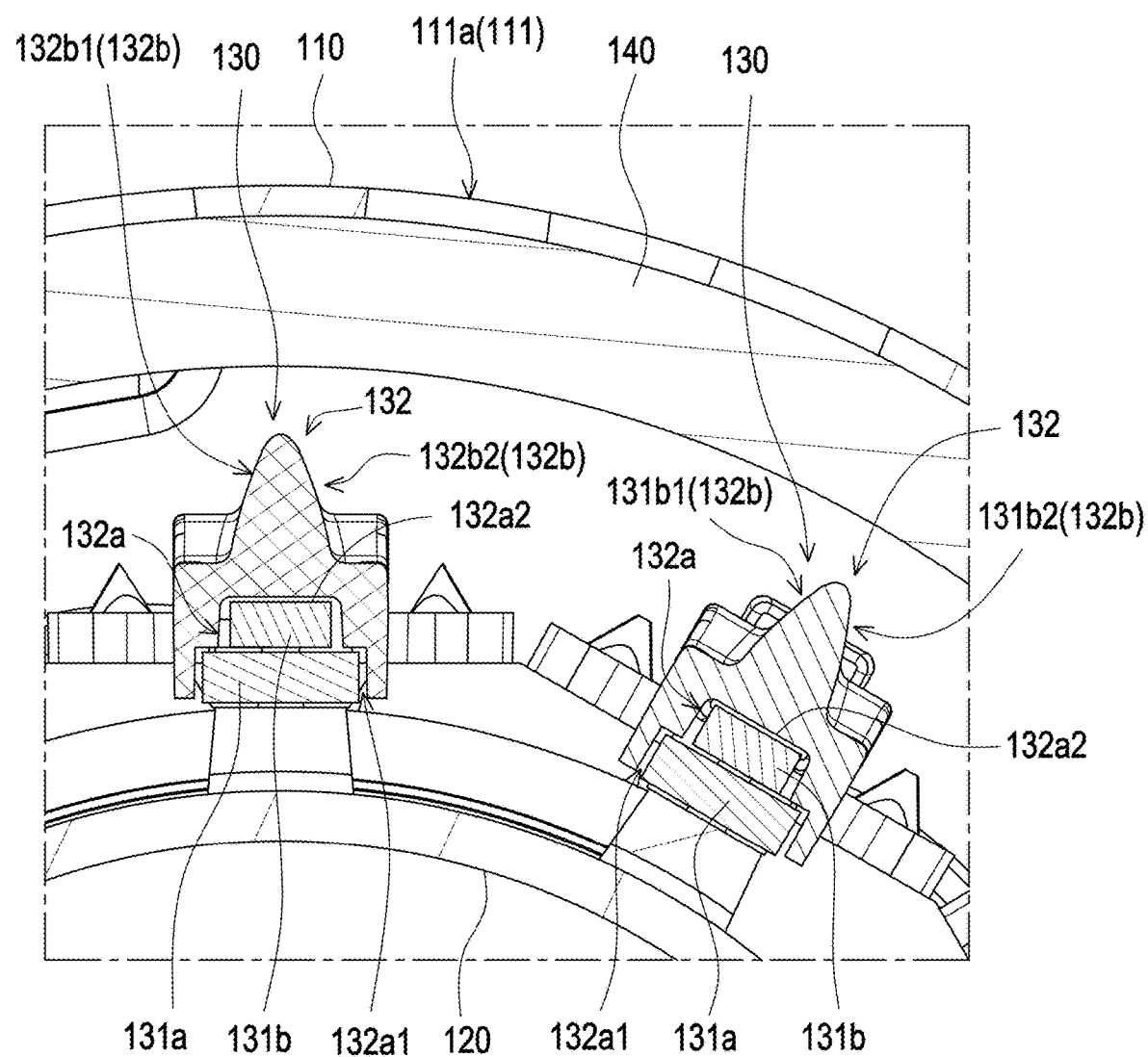
FIG. 1C is a partial enlarged view of FIG. 1B.

FIG. 1A is a schematic view of a microphone having a light-emitting structure in accordance with the disclosure. FIG. 1B is a cross-sectional view of FIG. 1A. FIG. 1C is a partial enlarged view of FIG. 1B. Please refer to FIG. 1A, FIG. 1B, and FIG. 1C at the same time. A microphone 100 having a light-emitting structure 130 includes a housing 110, a main body 120 and multiple light-emitting structures 130. The main body 120 is disposed in the housing 110, and the light-emitting structures 130 are disposed between the housing 110 and the main body 120 and fixed on the main body 120. Each of the light-emitting structures 130 also includes a light-emitting module 131 and a light guide structure 132. The light-emitting module 131 has a circuit board 131a and multiple light-emitting elements 131b, and the light-emitting elements 131b are disposed on the circuit board 131a. The light guide structure 132 has a groove 132a and a light guide part 132b, where the groove 132a covers the light-emitting module 131. The light guide part 132b is mountain-shaped and extends from the groove 132a in the direction of housing 110.

In detail, the groove 132a has an opening 132a1 and a bottom 132a2, where the opening 132a1 faces the main body 120. In addition, the circuit board 131a is fixed on the main body 120. Since the groove 132a covers the light-emitting module 131, the circuit board 131a is disposed at the opening 132a1, and the light-emitting elements 131b are covered by the groove 132a and face the bottom 132a2. That is, the light emitted by the light-emitting element 131b is only emitted through the light guide structure 132. The light-emitting modules 131 are arranged at equal intervals on the main body 120. In this embodiment, the number of the light-emitting structures 130 is 12. In other embodiments, the number of the light-emitting structures 130 can also be less than 12 or more than 12, as long as they are arranged at equal intervals on the main body 120, and the disclosure is not limited thereto. On the other hand, in this embodiment, the light-emitting structures 130 are vertically arranged on the main body 120 at equal intervals, and in other embodiments, the light-emitting structures 130 may also be arranged parallel to the main body 120 at equal intervals, and the disclosure is not limited thereto.

In addition, the light guide part 132b also has a first inclined surface 132b1 and a second inclined surface 132b2. The first inclined surface 132b1 and the second inclined surface 132b2 extend from the bottom 132a2 of the groove 132a in the direction of the housing 110 and are connected to each other near the housing 110. An acute angle is formed between the first inclined surface 132b1 and the second inclined surface 132b2, so that the light guide part 132b forms a mountain shape. Since the light guide part 132b is an inclined surface, when the light emitted by the light-emitting module 131 passes through the light guide part 132b, the light is emitted to both sides at different angles. That is, the first inclined surface 132b1 and the second inclined surface 132b2 of the light guide part 132b can make the light emitted by the light-emitting module 131 to be diffused toward the adjacent light-emitting structure 130 through the light guide structure 132, and make the light emitted by the light-emitting structure 130 to overlap with the light emitted by the adjacent light-emitting structure 130. As bright and dark areas are created between adjacent light-emitting structures 130, when the overlap of light between adjacent light-emitting structures 130 is low, this results in a more pronounced difference between the bright and dark areas. In this embodiment, the mountain-shaped light guide part 132b can increase the range of light emitted from the light-emitting element 131b to be diffused toward the two sides, and thus the overlap of light emitted from adjacent light-emitting elements 131b is increased, which can reduce the difference between the bright area and the dark area, so that the light emitted from the light-emitting structures 130 can be more uniformly emitted from the microphone 100.

On the other hand, the housing 110 has a mesh structure 111, and the mesh structure 111 has multiple holes 111a, so that the light emitted by the light-emitting structure 130 can be emitted from the microphone 100 through the mesh structure 111. In this embodiment, the holes 111a on the mesh structure 111 are circular. In other embodiments, the holes 111a on the mesh structure 111 may also be hexagonal, octagonal, or other shapes that are easy to stack, and the disclosure is not limited thereto.

Please continue to refer to FIG. 1A and FIG. 1B. The microphone 100 also includes a foam structure 140 disposed between the housing 110 and the light-emitting structures 130, where the foam structure 140 is translucent. In this embodiment, in addition to enhancing the airtightness of the microphone 100, the light emitted from the light-emitting structures 130 can be emitted out of the housing 110 through the foam structure 140 and the light emitted from the light-emitting structures 130 can be emitted more uniformly, due to the fact that the foam structure 140 is translucent.

Figure 2A:
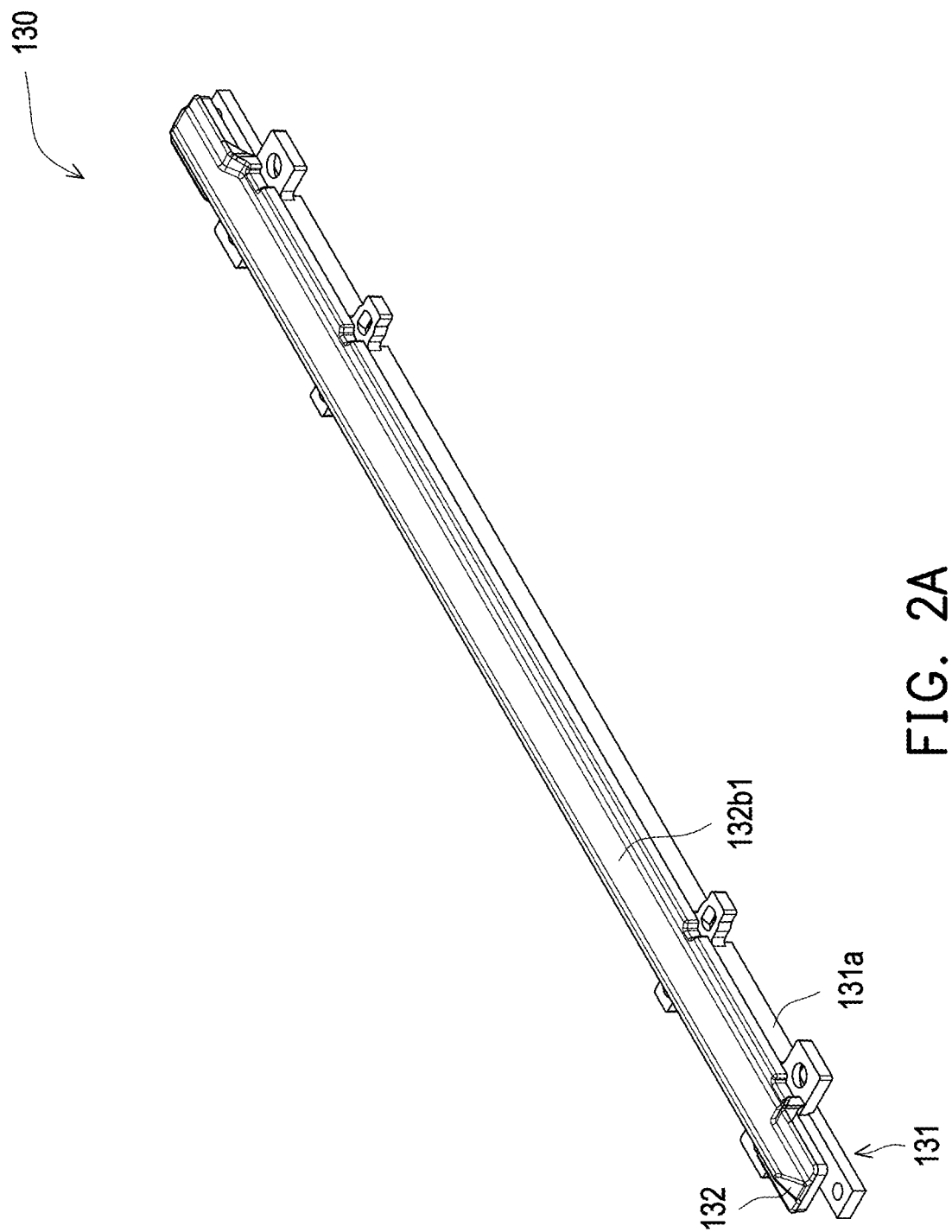
FIG. 2A is a schematic view of a light-emitting structure in accordance with the disclosure.
Figure 2B:
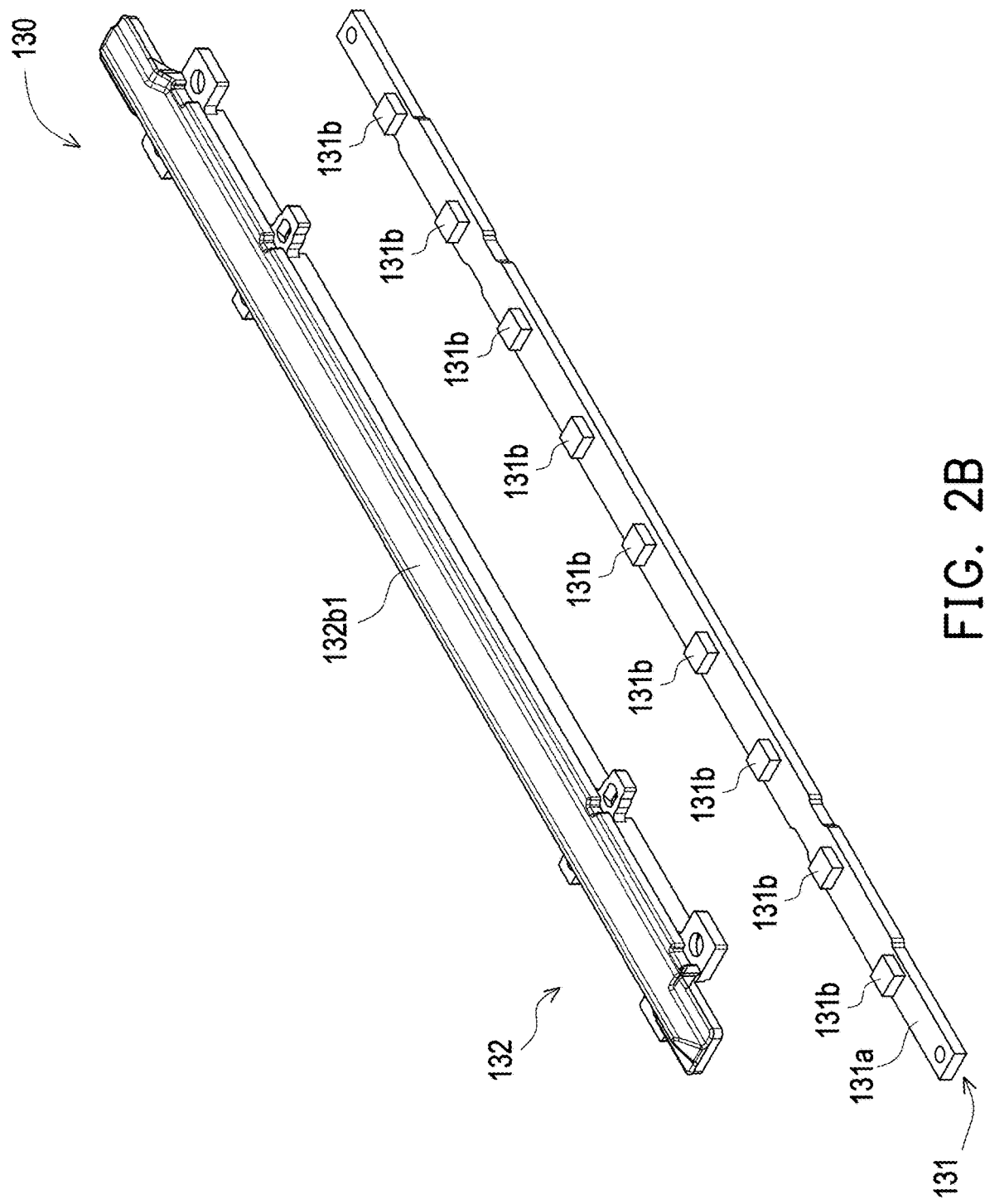
FIG. 2B is an exploded view of FIG. 2A.
Figure 2C:
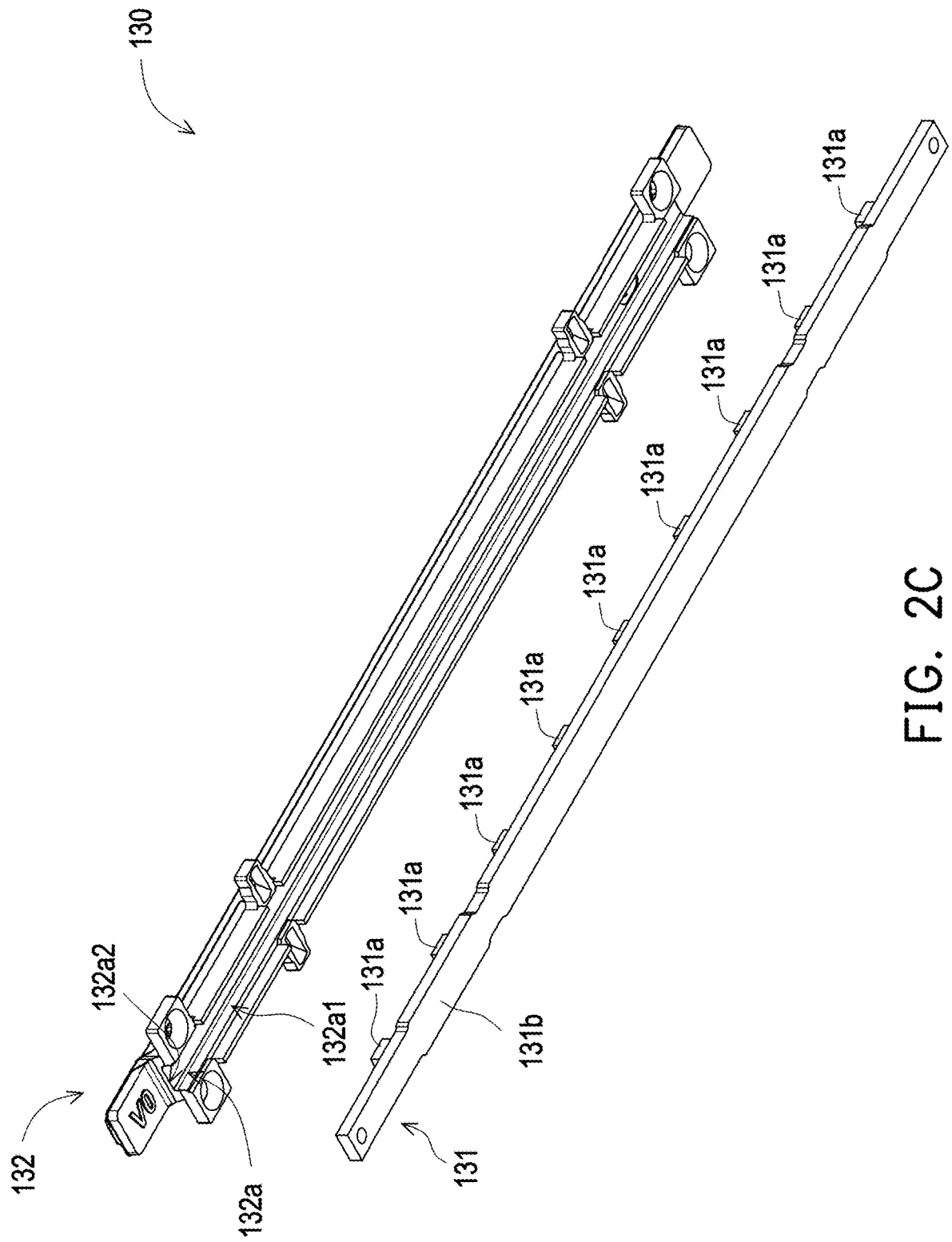
FIG. 2C is an exploded view of FIG. 2A from another perspective.

FIG. 2A is a schematic view of a light-emitting structure in accordance with the disclosure. FIG. 2B is an exploded view of FIG. 2A. FIG. 2C is an exploded view of FIG. 2A from another perspective. Please refer to FIG. 2A, FIG. 2B, and FIG. 2C at the same time. In this embodiment, each of the light-emitting elements 131b is a light-emitting diode, and the number is nine, and they are arranged on the circuit board 131a at equal intervals. In other embodiments, the number of the light-emitting elements 131b may be more than nine or less than nine, as long as they are arranged on the circuit board 131a at equal intervals, and the disclosure is not limited thereto. In addition, since the light-emitting elements 131b are spaced apart from each other, there will be a phenomenon that the brightness becomes higher closer to the light-emitting element 131b, resulting in localized bright spots. In order to improve the bright spot problem generated by the light-emitting element 131b, which leads to uneven light emission from the light-emitting structure 130, increasing the light diffusion effect of the light guide structure 132 can eliminate the bright spot problem generated by the light-emitting element 131b, so as to make the light emitted by the light-emitting structure 130 more uniform.

Specifically, in this embodiment, the light guide structure 132 is integrally formed by injection molding. The materials of the light guide structure 132 include polycarbonate, light diffusing agent, and titanium dioxide where the proportions are as follows: for every 25 kilograms of polycarbonate, 1150 to 1350 grams of light diffusing agent and 200 to 300 grams of titanium dioxide are added. That is, the proportion of polycarbonate is about 94%, the proportion of diffusing agent is about 5%, and the proportion of titanium dioxide is about 1%. At this ratio, the light guide structure 132 has a good light diffusion effect and can effectively reduce the defects of local bright spots generated by the light-emitting element 131b.

In this embodiment, the light-emitting module 131 emits light through the light-emitting elements 131b and emits the light through the light guide structure 132. Since the light guide structure 132 has a mountain shape, it can increase the diffusion range of the light emitted by the light-emitting element 131b, so that the overlap area of the light emitted by the adjacent light-emitting structure 130 is increased, effectively improving the difference between the bright and dark areas. In addition, by adding titanium dioxide to the light guide structure 132, the diffusion effect of the light guide structure 132 can be increased, so that the light emitted by the light-emitting module 131 can be emitted by the light guide structure 132 more uniformly, thereby reducing the problem of bright spots caused by the light-emitting element 131b. On the other hand, through the translucent foam structure 140, the light can be emitted evenly again. That is, through the light guide structure 132 and the foam structure 140, the bright spots as well as the differences between the bright areas and dark areas generated by the light emitted by the multiple light-emitting structures 130 can be effectively improved, so that the light can be emitted from the microphone 100 more uniformly.

To sum up, the light guide part of the disclosure has a mountain-shaped structure, which can more effectively emit the light emitted by the light-emitting module out of the light-emitting structure and reduce the differences between bright areas and dark areas of the adjacent light-emitting structures. In addition, adding diffusing agent and titanium dioxide to the light guide structure can effectively diffuse light, making the light emitted by the light guide structure more uniform and improving the visual experience of the user.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A microphone having at least one light-emitting structure, comprising:
    a housing;
    a main body, disposed in the housing; and
        the plurality of light-emitting structures, disposed between the housing and the main body and fixed on the main body, wherein each of the light-emitting structures also comprises:
            a light-emitting module, having a circuit board and a plurality of light-emitting elements, and the light-emitting elements are disposed on the circuit board; and
            a light guide structure, having a groove and a light guide part, wherein the groove covers the light-emitting module, and the light guide part is mountain-shaped and extends from the groove toward the housing.

2. The microphone having the light-emitting structure according to claim 1, wherein the light guide part has a first inclined surface and a second inclined surface, and the first inclined surface and the second inclined surface extend from the groove toward the housing and are connected to each other.

3. The microphone having the light-emitting structure according to claim 1, wherein the housing has a mesh structure.

4. The microphone having the light-emitting structure according to claim 3, wherein the mesh structure has a plurality of holes, and the holes are circular.

5. The microphone having the light-emitting structure according to claim 1 further comprising a foam structure, disposed between the housing and the light-emitting structures.

6. The microphone having the light-emitting structure according to claim 5, wherein the foam structure is translucent.

7. The microphone having the light-emitting structure according to claim 1, wherein a material of the light guide structure comprises polycarbonate, light diffusing agent, and titanium dioxide.

8. The microphone having the light-emitting structure according to claim 7, wherein 1150 to 1350 grams of the light diffusing agent and 200 to 300 grams of the titanium dioxide are added for every 25 kilograms of the polycarbonate.

9. The microphone having the light-emitting structure according to claim 1, wherein the light guide structure is translucent.

10. The microphone having the light-emitting structure according to claim 1, wherein one of the light-emitting structures overlaps light emitted by the adjacent light-emitting structures.

11. The microphone having the light-emitting structure according to claim 1, wherein the light guide structure is integrally formed.

* * * * *